US010802978B2

(12) United States Patent
Kilpatrick et al.

(10) Patent No.: US 10,802,978 B2
(45) Date of Patent: Oct. 13, 2020

(54) FACILITATION OF IMPACT NODE REBOOT MANAGEMENT IN A DISTRIBUTED SYSTEM

(71) Applicant: EMC IP Holding Company LLC, Hopkinton, MA (US)

(72) Inventors: Douglas Kilpatrick, Seattle, WA (US); Alexander Bahm, Seattle, WA (US); Antony Richards, Rose Bay (AU)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 88 days.

(21) Appl. No.: 16/254,997

(22) Filed: Jan. 23, 2019

(65) Prior Publication Data

US 2020/0233810 A1   Jul. 23, 2020

(51) Int. Cl.
*G06F 12/08* (2016.01)
*G06F 12/0891* (2016.01)
*G06F 12/02* (2006.01)

(52) U.S. Cl.
CPC ...... *G06F 12/0891* (2013.01); *G06F 12/0238* (2013.01); *G06F 2212/604* (2013.01)

(58) Field of Classification Search
CPC ............. G06F 12/0238; G06F 12/0842; G06F 12/0871; G06F 12/0891; G06F 2212/604

USPC ......................... 711/120, 121, 124, 135, 165
See application file for complete search history.

(56) References Cited

U.S. PATENT DOCUMENTS

| 2005/0240652 | A1* | 10/2005 | Crick | G06F 16/9574 |
| | | | | 709/203 |
| 2014/0137136 | A1* | 5/2014 | Zhang | G06F 9/542 |
| | | | | 719/318 |
| 2015/0019822 | A1* | 1/2015 | Samanta | G06F 11/1666 |
| | | | | 711/135 |
| 2019/0026226 | A1* | 1/2019 | Boyd | G06F 11/141 |

* cited by examiner

*Primary Examiner* — Gary J Portka
(74) *Attorney, Agent, or Firm* — Amin, Turocy & Watson, LLP (57) ABSTRACT

Node resets in a distributed environment can be disruptive due to the need to reset shared state. However, a central system can notify all other nodes asynchronously of a pending event, and then multiple nodes can use that notification to mitigate costs when it actually happens. For example, in anticipation of a first node leaving a group of nodes, a second node can reduce its cache to store the cache from the first node. Additionally, a client device can be directed to the second node so as not to interrupt a service provided to the client device by the first node.

20 Claims, 10 Drawing Sheets

FACILITATION OF IMPACT NODE REBOOT MANAGEMENT IN A DISTRIBUTED SYSTEM

TECHNICAL FIELD

The subject disclosure relates generally to distributed node environments. More specifically, this disclosure relates to asynchronously notifying system nodes of pending events to mitigate coordination issues.

BACKGROUND

Distributed computing is a field of computer science that studies distributed systems. A distributed system is a system whose components are located on different networked computers, which then communicate and coordinate their actions by passing messages to one another. The components interact with one another in order to achieve a common goal. Three significant characteristics of distributed systems are: concurrency of components, lack of a global clock, and independent failure of components. Examples of distributed systems vary from service-oriented architecture based systems to massive multiplayer online games to peer-to-peer applications.

A computer program that runs within a distributed system is called a distributed program (and distributed programming is the process of writing such programs). There are many different types of implementations for the message passing mechanism, including pure hypertext transfer protocol (HTTP), remote procedure call (RPC) connectors and message queues.

Distributed computing also refers to the use of distributed systems to solve computational problems. In distributed computing, a problem is divided into many tasks, each of which is solved by one or more computers, which communicate with each other via message passing.

The above-described background relating to distributed computing is merely intended to provide a contextual overview of some current issues, and is not intended to be exhaustive. Other contextual information may become further apparent upon review of the following detailed description.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its sole purpose is to present some concepts of the specification in a simplified form as a prelude to the more detailed description that is presented in this disclosure.

Example systems and methods disclosed herein relate to node reboot management. In one example embodiment of the specification, a method can comprise receiving, by a first node device comprising a processor from a second node device, status data representative of status of the second node device. In response to the receiving the status data, the method can comprise purging, by the first node device, a cache of the first node device to allocate space for cached data from the second node device. In response to the purging the cache of the first node device, the method can comprise sending, by the first node device, update data indicative of the cache having been purged by the first node device. Additionally, them method can comprise receiving, by the first node device, the cached data from the second node device in response to the sending the update data.

In one example embodiment, a system is disclosed that comprises a processor and a memory that stores executable instructions that, when executed by the processor, facilitate performance of operations comprising receiving status data associated with a status of a first node device of a group of node devices. The system can facilitate transmitting the status data to a second node device of the group of node devices. Based on a memory associated with the second node device, the system can facilitate receiving acknowledgment data representative of first cache data associated with a first cache of the second node device. Furthermore, based on the acknowledgment data, the system can facilitate transmitting second cache data associated with a second cache of the first node device to the first cache of the second node device.

Another example embodiment of the specification relates to a computer-readable storage medium comprising instructions that, in response to execution, cause a device comprising a processor to perform operations, comprising receiving status data associated with an imminent status of a first node device of a group of node devices. The operations can comprise facilitating transmitting the status data to a second node device of the group of node devices. Based on a memory associated with the second node device, the operations can comprise receiving acknowledgment data representative of an acknowledgment that the second node device received the status data. Based on the acknowledgment data, the computer-readable medium operations can comprise facilitating transmitting cache data from the first node device to the second node device. Additionally, in response to the facilitating the transmitting the cache data, the operations can comprise removing the first node device from the group of node devices.

The following description and the drawings set forth certain illustrative aspects of the specification. These aspects are indicative, however, of but a few of the various ways in which the principles of the specification may be employed. Other advantages and novel features of the specification will become apparent from the detailed description of the specification when considered in conjunction with the drawings.

DETAILED DESCRIPTION

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

The term "cloud" as used herein can refer to a cluster of nodes (e.g., set of network servers), for example, within a distributed object storage system, that are communicatively and/or operatively coupled to each other, and that host a set of applications utilized for servicing user requests. In general, the cloud computing resources can communicate with user devices via most any wired and/or wireless communication network to provide access to services that are based in the cloud and not stored locally (e.g., on the user device). A typical cloud-computing environment can include multiple layers, aggregated together, that interact with each other to provide resources for end-users.

When a node fails currently in the distributed file system, the impact to the client or client device can be great. When a node fails, the file system can be locked up for a period time, which prevents the client for using the file system. This disclosure presents embodiments to minimize the impact of node failure.

For planned failures for a node, an impending failure can be advertised to other nodes so that the other nodes can begin to preprocess data such that when the node is actually shut down, the other nodes can have less work to perform. For example, a "system pending shutdown" status, called a drain, can be advertised to a group of nodes within a distributed node system. The advertisement can be hosted via an advertisement channel and the nodes can subscribe to the advertisement channel and use the advertisement notifications to adjust Internet protocol (IP) addresses. A group management protocol can manage which nodes are currently up and which nodes are currently down (e.g., dynamic node configuration). A flag can be added to node management data (e.g., drain service) to indicate which node will be down. When the flag exists for a node, other nodes can then have the opportunity to begin processing data in a manner that can mitigate the effect of the node being down. A lazy drain can reduce the amount of data to be cached, when there is an impending node group change, by allowing several other nodes to cache data prior to the impending node group change.

When a node is going out of service, it can advertise to the group that it is going out of service within a timeframe (e.g., 30 seconds-60 seconds, etc.). The other nodes that receive the advertisement can throw away their cache in order to facilitate the process of receiving the cache from the node that is going out of service. However, once the node leaves the group, it cannot advertise to the group that it is going away. Conversely, if the node comes back into the group, the other nodes cannot know that the node is coming back in.

Hooks can be added into the distributed lock system so that when any node in the cluster is advertising the drain service, the lock system can reduce the size of it's cache so that when the group change happens less state will need to be reasserted. Adding hooks to the distributed lock system means that a node's response to seeing an advertisement of a drain service going up is to call this function from the distributed lock system and reduce its cache. However, the cache reduction can be automatically undone when the node resets because the node is no longer in the group to advertise it's draining status.

The group management system is part of a kernel for figuring out which nodes are up or down. This is where the drain services can be advertised. Once the drain services are advertised by one node, other nodes can acknowledge that the drain service is up. Thus, any interested processes associated with the nodes can listen to receive notifications of a group change occurring (e.g., a service group change). The nodes can query to read a chunk of memory from the kernel that indicates what the current group looks like, and this is where they can find out that the service group change in question is one where the drain service commenced or terminated.

If a node fails to process a message, which can be indicated by a lack of acknowledgment of the message, then the node can fail to process subsequent messages. After a defined time period or expiration of time for the node failing to process messages (e.g., when the node runs out of memory), then the node can be disconnected and/or removed from the group. The group management system can then be updated to reflect the group change.

A distributed lock system is a node that can have hard drives that are attached, read block those hard drives, and keep those blocks in a cache. The things that are cached are controlled with tunables based on how much memory the node has even if the cache that is being held is for another node. Since the node is holding the cache for another node, the current node's memory is the relevant memory. Thus, the current node has a tunable associated with how many items it is allowed to have cached (e.g., virtual (v) node cache). The amount of virtual nodes kept cached can be a function of random access memory (RAM). When a group is changed, the amount of processing needed to be performed can be a function of how much data is cached. For example, the larger the v-node cache is, the more messages can be exchanged to keep the v-node in memory (e.g., cached). If the amount of time the group change takes is proportional to the cache of the node, and another node goes away, the processing does not depend on how big the memory of the node that is shutting down is. Rather, the amount of processing depends on how big the memories of the remaining nodes are, which is why the shutting down of a node can be advertised to let other nodes begin to preprocess and adjust their cache. Thus, when a larger memory node is alerted that another node is shutting down, then the larger memory node can reduce the size of its cache to something smaller by beginning to throw away v-nodes so that it does not have to throw them away during the group change or keep a lock during the group change.

When a node is in a group, a group change (e.g., node leaving the group or coming into the group) can include a server message blog (SMB) being included on a node. Thus, there can be an advertisement that a SMB is up and when the SMB goes down, it can be advertised that the SMB is going down. Thus, if there were locks on a node on behalf of the SMB, then that node can begin to orphan those locks after receiving the advertisement that the SMB is going down.

Protocols like network service part 3 (NSP3) and network file system (NFS) protocols are not cluster aware. Therefore, for those protocols, Internet protocol (IP) addresses can be migrated so that the IP addresses land on an up node. This can ensure that current activity is not interrupted by the current activity being migrated to a node that is about to shut down. However, if there is communication with a client that indicates that a node is shutting down, the client can be redirected, via the IP address of a node that is up, to improve the client's experience. For example, the system can stop replying with an IP address for a node that is about to drain or a node that is currently draining, and reply with the IP address of a node that is to store the cache of the node that has/is going down. Thus, the client can finish receiving the files from another node, via a new node connection, other than the node that it had begun to download the files from. Alternatively, clients that connect during a draining window, can be directed to a non-draining node to prevent downtime. (For example, an extension can add support to an SMB witness service and to an NFS service to migrate the NFS and the SMB connections off the IP address, and to add support to a web user interface or web distributed authoring and versioning (DAV) services to redirect to a non-draining IP.

Figure 1:
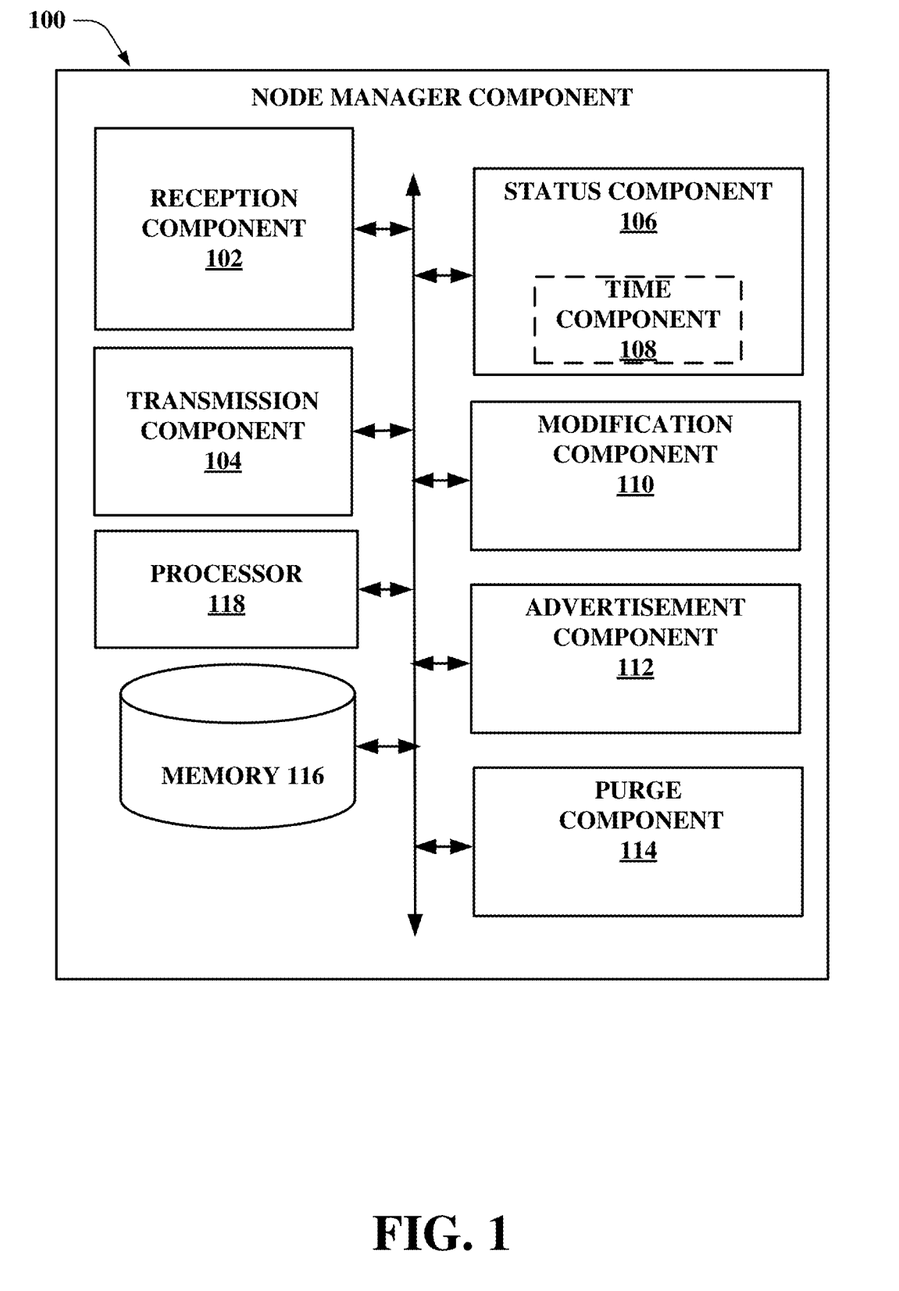
FIG. 1 illustrates an example node management component in one or more embodiments.

Referring initially to FIG. 1, illustrated is an example node management component in one or more embodiments. The node manager component 100 can comprise a reception component 102, a transmission component 104, a status component 106 comprising a time component 108, a modification component 110, an advertisement component 112, and a purge component 114. It should also be noted that in alternative embodiments that these or other components can be external to the node manager component 100. For example, the modification component 110 can be external to the node manager component 100 and act as a stand-alone processor. It should also be noted that these components can be communicatively coupled to each other.

Aspects of a processor 118 can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described herein. In an aspect, the node manager component 100 can also include memory 116 that stores computer executable components and instructions. It should be noted that the node manager component 100 can be separate from the other nodes. However, in other embodiments, the other nodes can possess the functionalities comprised within the node manager component as represented by FIG. 1.

The reception component 102 can be configured to receive data from various nodes within a distributed node system and the transmission component 104 can be configured to transmit data to the nodes with the distributed nodes system. For example, the reception component 102 can receive an advertisement from a node device and communicate this data to the advertisement component 112 to determine what type of advertisement it is (e.g., node going down and/or node coming into the group).

Based on the advertisement, the status component 106 can update a status associated with the node. For example, the status can be updated to indicate that the node is leaving the group, going offline, or has just joined the group. The status component 106 can also comprise a time component 108 that is configured to indicate when the node will leave the group (e.g., between 10-20 seconds). Once the advertisement component 112 has made a determination as to the status, the advertisement component can transmit the advertisement, via the transmission component 104, to other nodes in the network. Thereafter, the reception component 102 can receive acknowledgment data from the nodes that have acknowledged the status of the node going offline. If a node of the node network has failed to acknowledge that status, then the purge component 114 can purge that node from the node group so that that node is not relied upon for future communications. Nodes that receive the status update can reduce their cache size to compensate for the cache of the node that is going offline by caching the data from the node that is going offline.

The modification component 110 can modify an IP address associated with the system such that a client device does not request data from the node that is going offline. Rather, the modification component 110 can update an IP address such that the client device requests the data from a node that is storing, has stored, or will store the cache of the node that is going offline.

Figure 2:
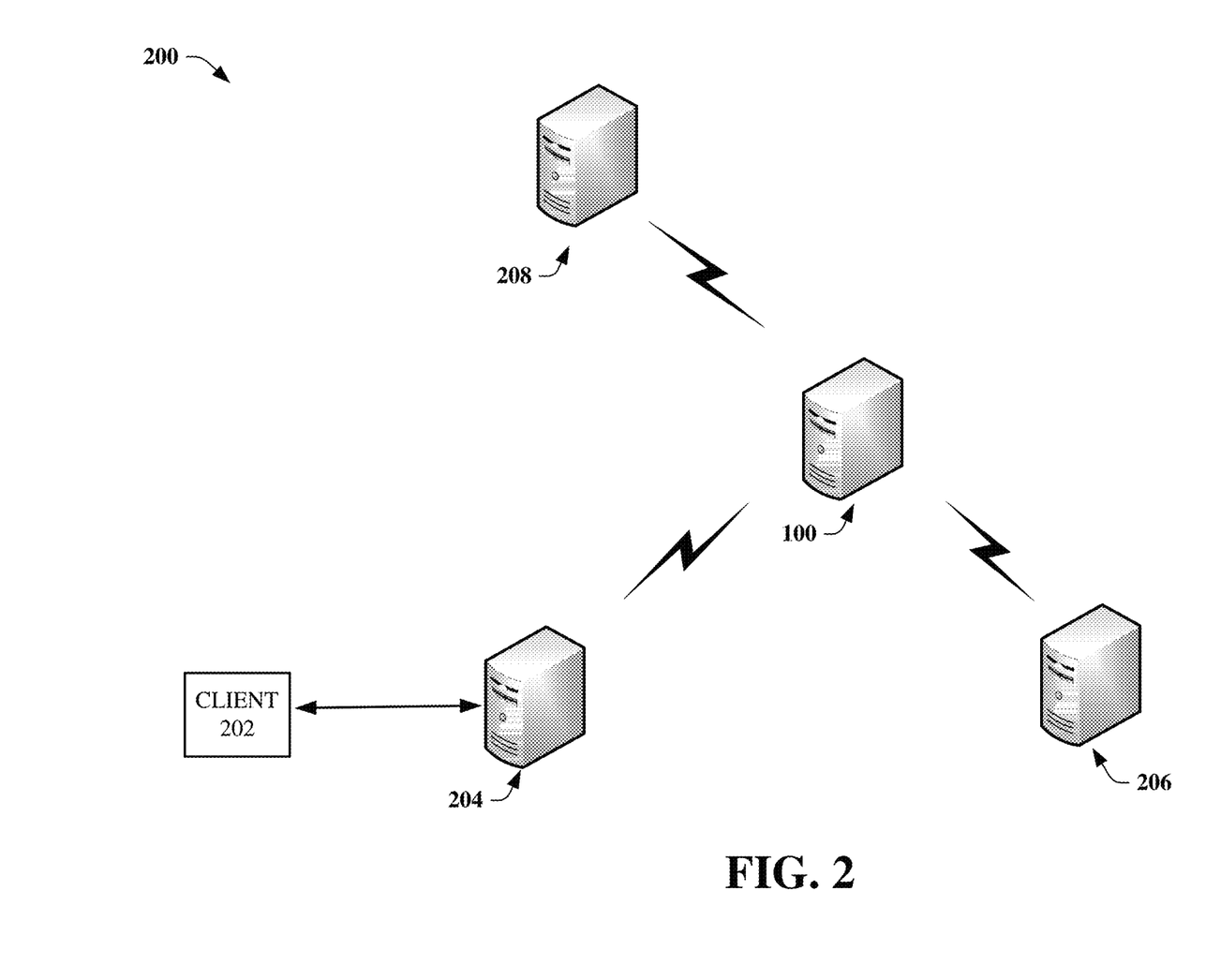
FIG. 2 illustrates an example distributed node network in one or more embodiments.
Figure 3:
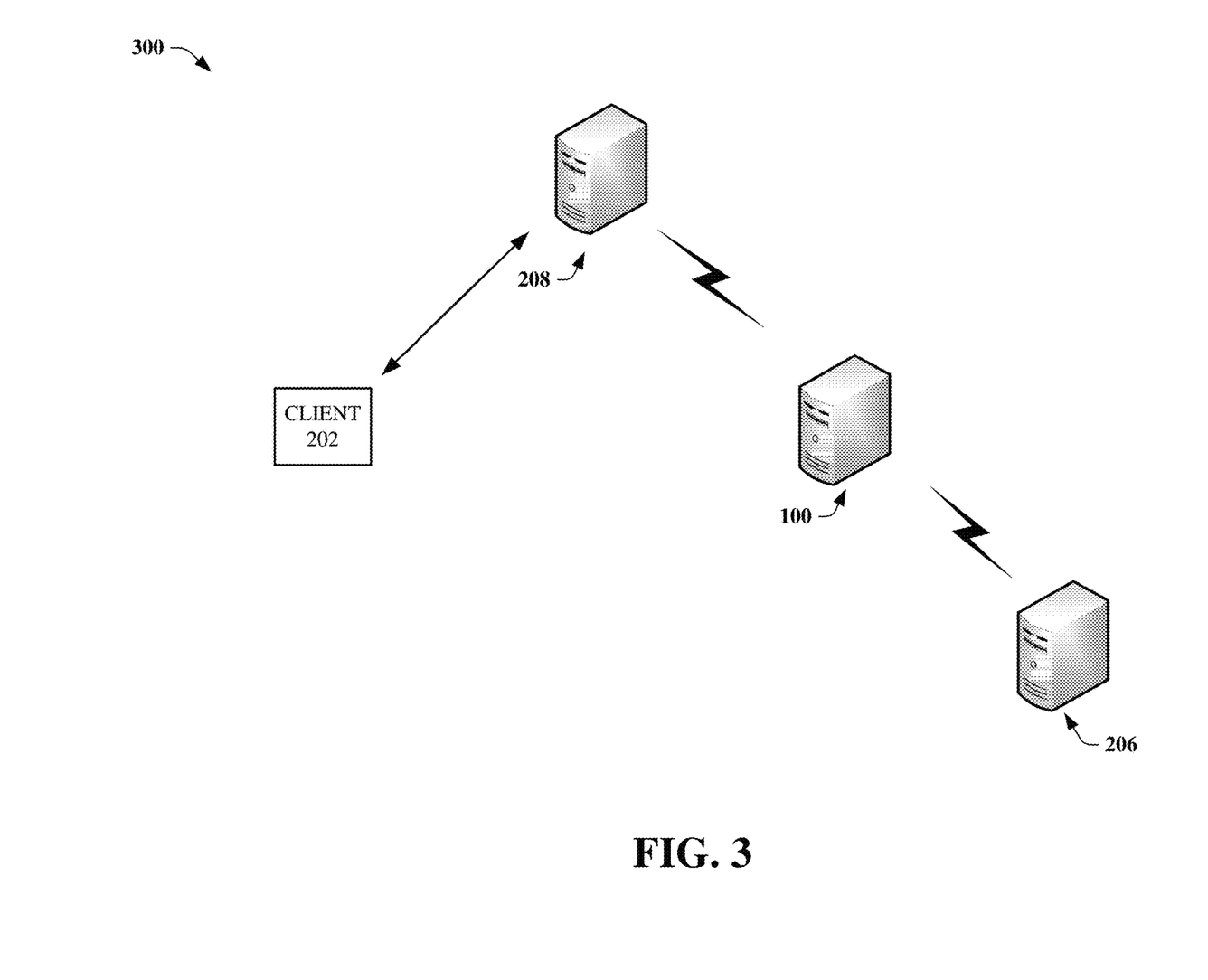
FIG. 3 illustrates an example modified distributed node network in one or more embodiments.

Referring now to FIG. 2-FIG. 5, there are several example node networks 200, 300, 400, 500 illustrated in one or more embodiments. FIG. 2 depicts a client device 202 communicating with a node 204. The node 204 can communicate with the node manager component 100. The node manager component 100 can also communicate with other nodes 208, 206. Consequently, if the node 204 advertises that it is leaving the group, the node manager component 100 can receive this information and pass it to the other nodes 208, 206. Based on the available memory of the other nodes 206, 208, they can acknowledge the advertisement that the node 204 is leaving the group and indicate to the node manager component 100 that they have memory to store the cache of the node 204. The modification component 110 can then modify an IP address associated with the system such that the client 202 can communicate with the nodes 208, as shown in FIG. 3, in response to the node 204 advertising that it is leaving the group and in response to the node 208 indicating that it has the memory capacity to cache the cache of the node 204. It should also be noted that the purge component can facilitate the node 208 purging data to allocate memory for the cache of the node 204.

Figure 4:
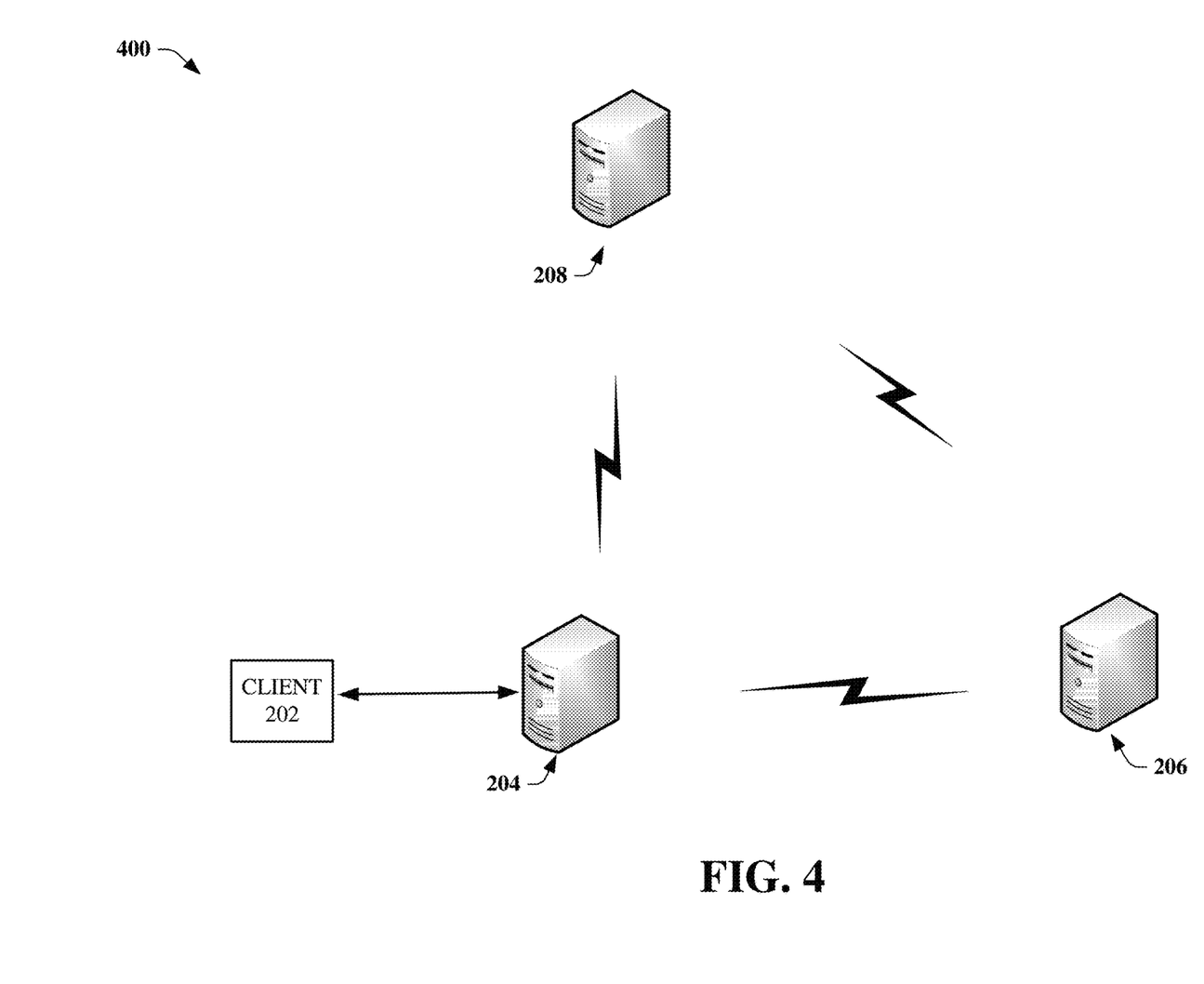
FIG. 4 illustrates an example distributed node network in one or more embodiments.
Figure 5:
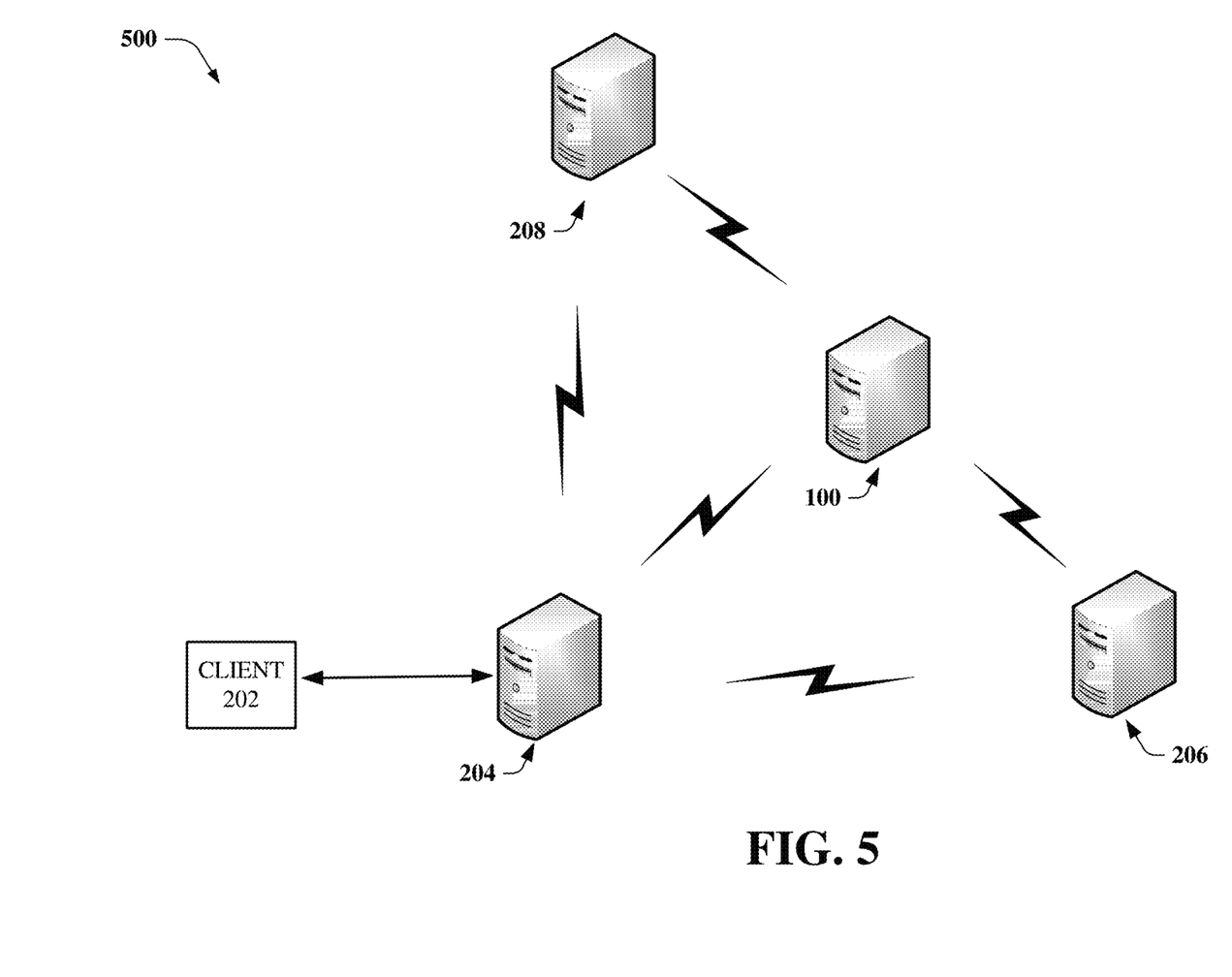
FIG. 5 illustrates an example distributed node network in one or more embodiments.

In another embodiment, as depicted in FIG. 4, the node devices can communicate amongst themselves directly without the need of node manager component 100. Thus, the advertisement that the node 204 is leaving the group can be received directly by the nodes 206, 208. Consequently, the nodes 206, 208 can cache the data from the node 204 in response to the node 204 leaving the group or indicating that it is leaving the group. Additionally, FIG. 5 depicts a hybrid between FIG. 2 and FIG. 4 wherein the node device 204 leaving the group, can communicate directly with the other nodes 206, 208 and communicate with the node manager component 100 simultaneously.

Figure 6:
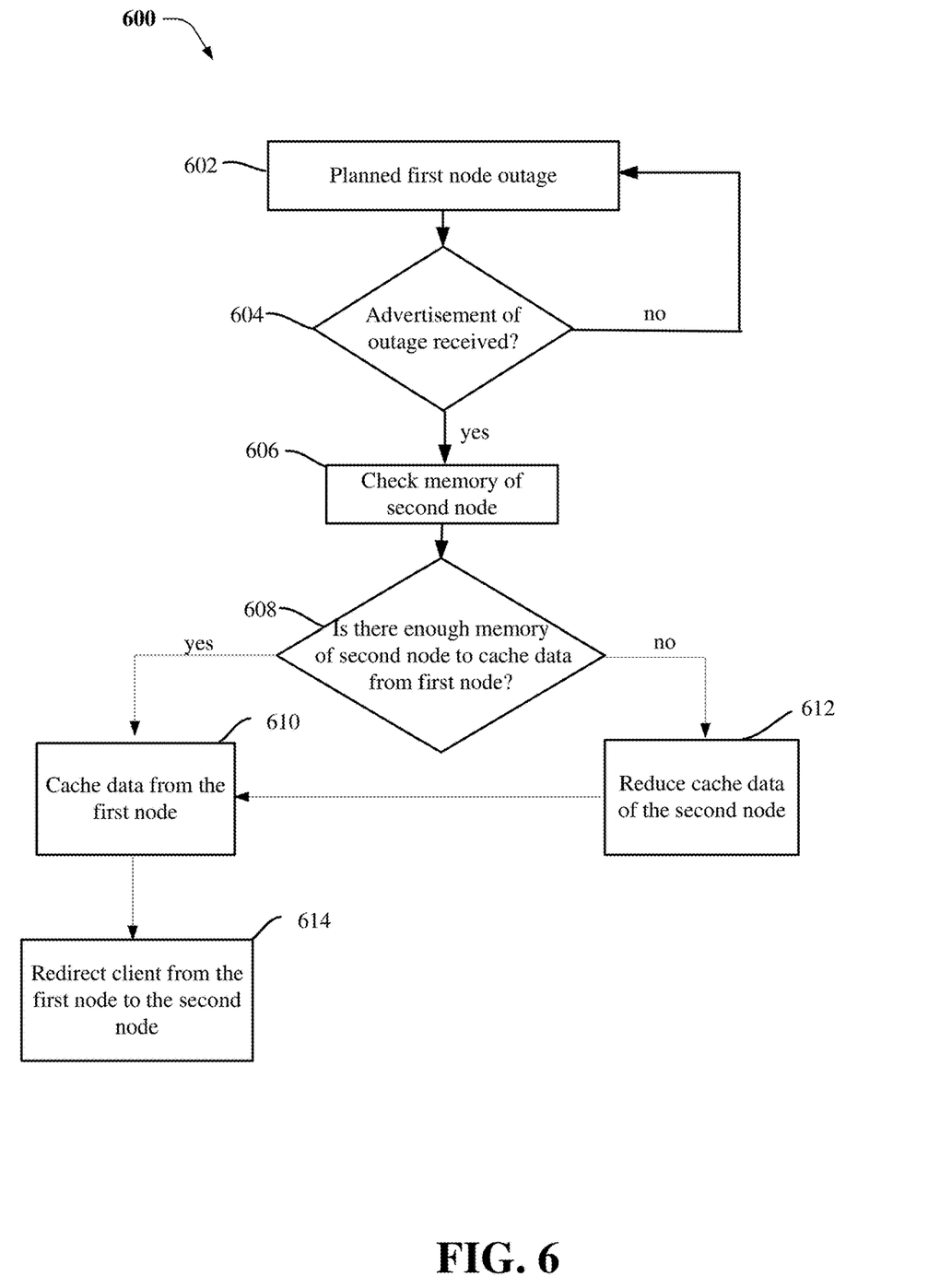
FIG. 6 illustrates an example flow diagram for a node management system in one or more embodiments.

Referring now to FIG. 6, illustrated is an example flow diagram 600 for a node management system in one or more embodiments. When the node device 204 (e.g., first node) has a planned outage at block 602, the node manager component 100 can check to determine if an advertisement of the outage has been received by the node management component at block 604. If the advertisement of the outage has not been received, then the system can go back to block 602, recursively. However, if the advertisement of the outage has been received, then the node manager component 100 can facilitate checking memory of the node 206 (e.g., second node) at block 606. The node 206, can then determine if there is enough memory for the node 206 to cache data from the node 204 at block 608. If there is enough memory, then node 206 can cache the data from the first node at block 610. However, if there is not enough memory then the node 206 can reduce its cache data at block 612 and then cache the data from the node 204. After the node 206 has cached the data from the node 204, then the system can redirect the client from the node 204 to the node 206 by virtue of an IP address at block 614.

Figure 7:
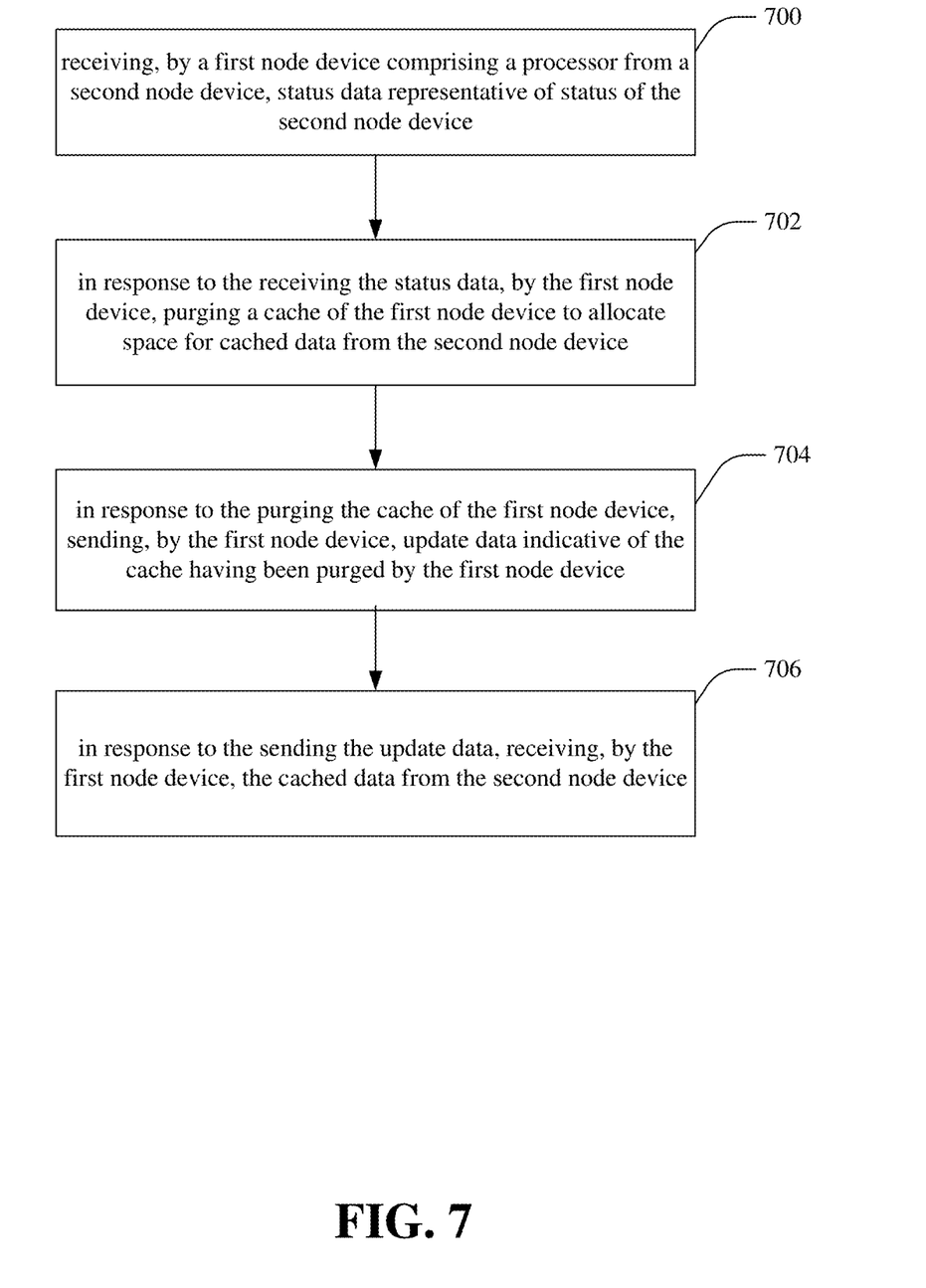
FIG. 7 illustrates an example method flow diagram for a node management system in one or more embodiments.

Referring now to FIG. 7, illustrated is an example method flow diagram for a node management system in one or more embodiments. At element 700, a method can comprise receiving (e.g., via the reception component 102), by a first node device (e.g., node 206) comprising a processor from a second node device (e.g., node 204), status data representative of status (e.g., via status component 106) of the second node device (e.g., node 204). In response to the receiving the status data, the method can comprise purging (e.g., via the purge component 114), by the first node device (e.g., nodes 206, 208), a cache of the first node device (e.g., nodes 206, 208) to allocate space for cached data from the second node device (e.g., node 204) at element 702. In response to the purging the cache of the first node device (e.g., nodes 206, 208), at element 704, the method can comprise sending (e.g., via the transmission component 104), by the first node device (e.g., nodes 206, 208), update data indicative of the cache having been purged by the first node device (e.g., nodes 206, 208). Additionally, them method can comprise receiving (e.g., via the reception component 102), by the first node device, the cached data from the second node device (e.g., node 204) in response to the sending the update data at element 704.

Figure 8:
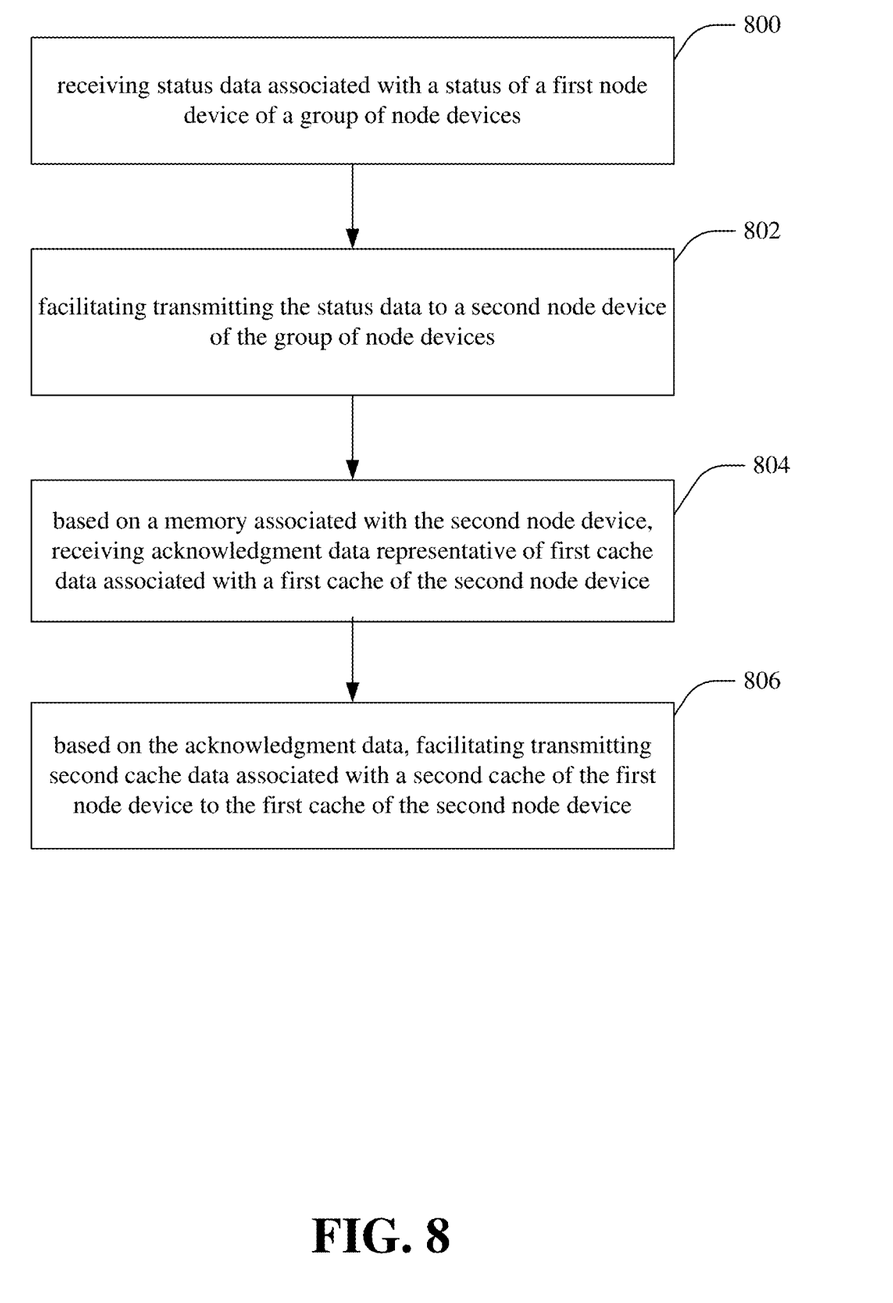
FIG. 8 illustrates an example system flow diagram for a node management system in one or more embodiments.

Referring now to FIG. 8, illustrated is an example system flow diagram for a node management system in one or more embodiments. At element 800, a system can facilitate performance of operations comprising receiving (e.g., via the reception component 102) status data (e.g., via a node manager component 100) associated with a status of a first node device of a group of node devices. The system can facilitate transmitting (e.g., via the transmission component 104) the status data to a second node device (e.g., nodes 206, 208) of the group of node devices at element 802. Based on a memory associated with the second node device (e.g., nodes 206, 208), at element 804, the system can facilitate receiving (e.g., via the reception component 102) acknowledgment data representative of first cache data associated with a first cache of the second node device (e.g., nodes 206, 208). Furthermore, based on the acknowledgment data, the system can facilitate transmitting (e.g., via the transmission component 104) second cache data associated with a second cache of the first node device (e.g., node 204) to the first cache of the second node device (e.g., nodes 206, 208) at element 806.

Figure 9:
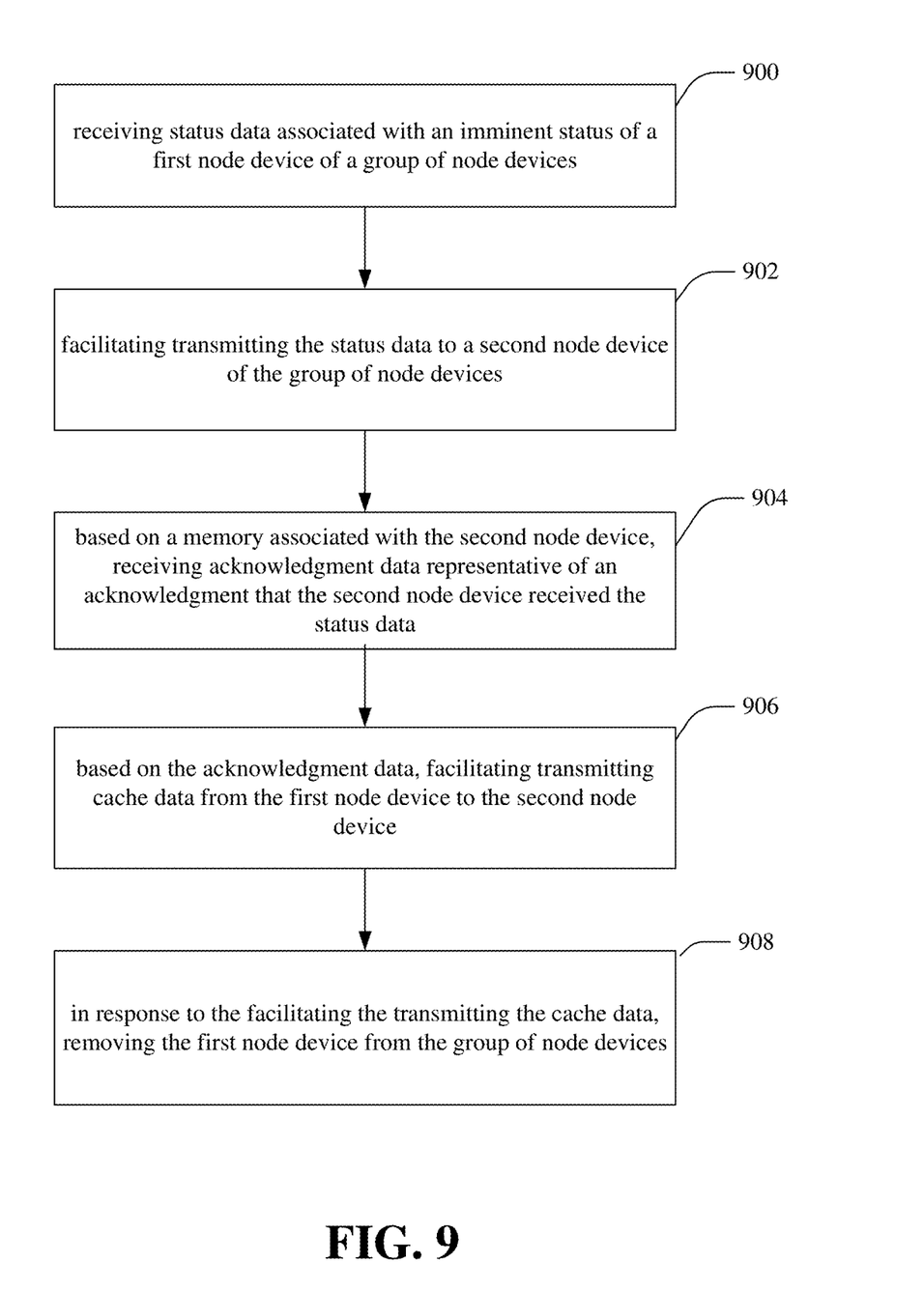
FIG. 9 illustrates an example computer-readable medium flow diagram for a node management system in one or more embodiments.

Referring now to FIG. 9, illustrated is an example computer-readable medium flow diagram for a node management system in one or more embodiments. At element 900, a computer-readable medium can cause a device comprising a processor to perform operations, comprising receiving (e.g., via the reception component 102) status data associated with an imminent status of a first node device (e.g., node 204) of a group of node devices. The operations can comprise facilitating transmitting (e.g., via the transmission component 104) the status data to a second node device (e.g., nodes 206, 208) of the group of node devices at element 902. Based on a memory associated with the second node device (e.g., nodes 206, 208), the operations can comprise receiving (e.g., via the reception component 102) acknowledgment data representative of an acknowledgment that the second node device (e.g., nodes 206, 208) received the status data at element 904. Based on the acknowledgment data, at element 906, the computer-readable medium operations can comprise facilitating transmitting (e.g., via the transmission component 104) cache data from the first node device (e.g., node 204) to the second node device (e.g., nodes 206, 208). Additionally, in response to the facilitating the transmitting (e.g., via the transmission component 104) the cache data, at element 908, the operations can comprise removing (e.g., via the purge component 114) the first node device (e.g., node 204) from the group of node devices.

Figure 10:
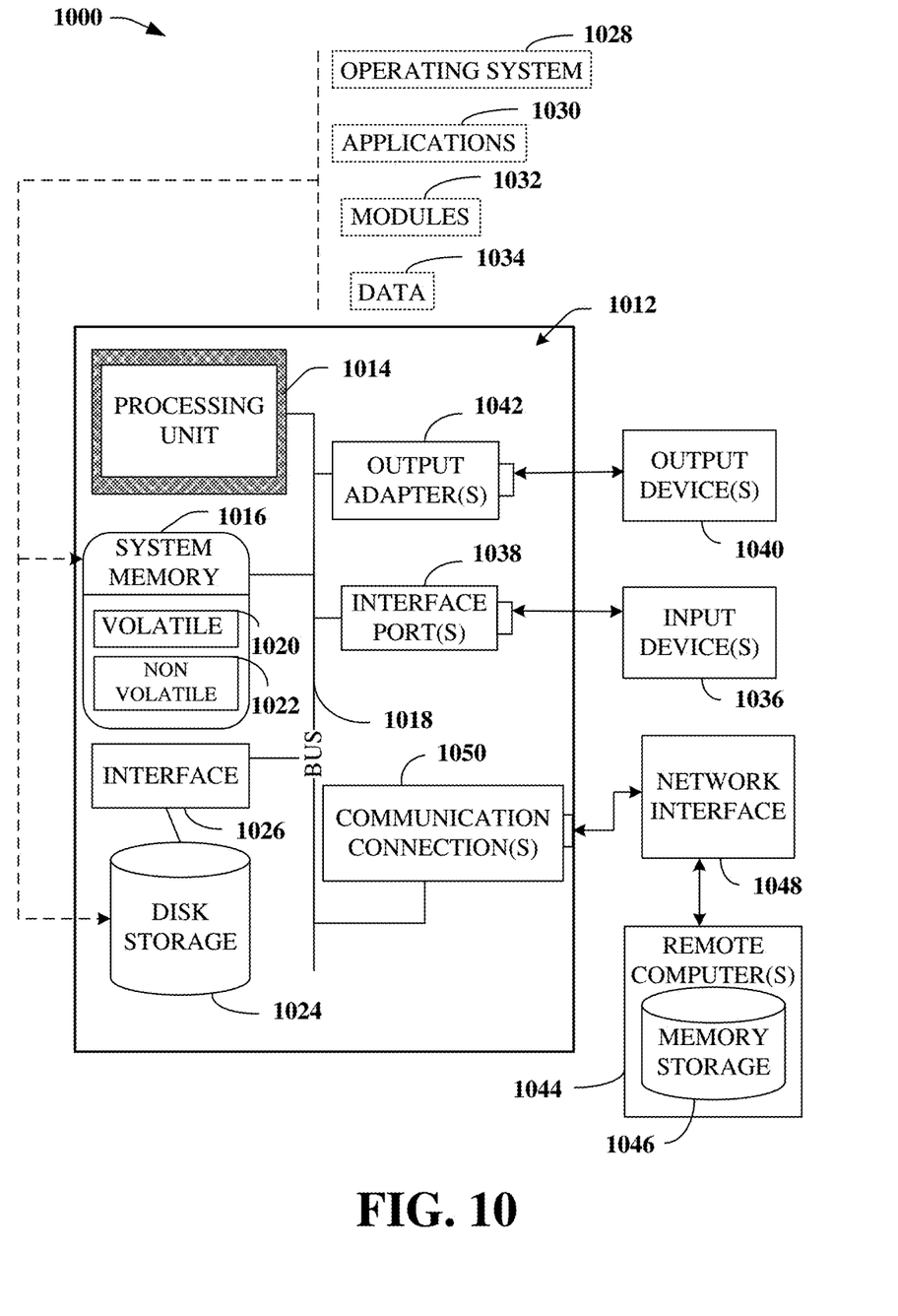
FIG. 10 illustrates a block diagram of an example computer operable to execute the replication progress tracking.

Referring now to FIG. 10, there is illustrated a block diagram of an example computer operable to execute the data deletion for distributed erasure coding. In order to provide additional context for various aspects of the disclosed subject matter, FIG. 10 and the following discussion are intended to provide a brief, general description of a suitable computing environment in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices. The illustrated aspects of the specification can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, radio frequency (RF), infrared and other wireless media.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that various embodiments disclosed herein can be implemented in combination with other program modules. Generally, program modules comprise routines, programs, components, data structures, etc. that perform particular tasks and/or implement particular abstract data types.

Moreover, those skilled in the art will appreciate that the inventive systems can be practiced with other computer system configurations, comprising single-processor or multiprocessor computer systems, computing devices, mini-computing devices, mainframe computers, as well as personal computers, hand-held computing devices (e.g., PDA, phone, watch), microprocessor-based or programmable consumer or industrial electronics, and the like. The illustrated aspects can also be practiced in distributed computing environments where tasks are performed by remote processing devices that are linked through a communication network; however, some if not all aspects of the subject disclosure can be practiced on stand-alone computers. In a distributed computing environment, program modules can be located in both local and remote memory storage devices.

With reference to FIG. 10, a block diagram of a computing environment 1000, (e.g., node manager component 100), wherein the computing environment 1000 is operable to execute the disclosed systems and methods is illustrated, in accordance with an embodiment. Computer 1012 comprises a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture (ISA), micro-channel architecture (MSA), extended ISA (EISA), intelligent drive electronics (IDE), VESA local bus (VLB), peripheral component interconnect (PCI), card bus, universal serial bus (USB), advanced graphics port (AGP), personal computer memory card international association bus (PCMCIA), Firewire (IEEE 1394), small computer systems interface (SCSI), and/or controller area network (CAN) bus used in vehicles.

System memory 1016 comprises volatile memory 1020 and nonvolatile memory 1022. A basic input/output system (BIOS), containing routines to transfer information between elements within computer 1012, such as during start-up, can be stored in nonvolatile memory 1022. By way of illustration, and not limitation, nonvolatile memory 1022 can comprise ROM, PROM, EPROM, EEPROM, or flash memory. Volatile memory 1020 comprises RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 also comprises removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, Jaz drive, Zip drive, LS-100 drive, flash memory card, or memory stick. In addition, disk storage 1024 can comprise storage media separately or in combination with other storage media comprising, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to system bus 1018, a removable or non-removable interface is typically used, such as interface 1026.

It is to be appreciated that FIG. 10 describes software that acts as an intermediary between users and computer resources described in suitable operating environment for a computer environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be appreciated that the disclosed subject matter can be implemented with various operating systems or combinations of operating systems.

A user can enter commands or information into computer 1012 through input device(s) 1036. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cellular phone, user equipment, smartphone, and the like. These and other input devices connect to processing unit 1014 through system bus 1018 via interface port(s) 1038. Interface port(s) 1038 comprise, for example, a serial port, a parallel port, a game port, a universal serial bus (USB), a wireless based port, e.g., Wi-Fi, Bluetooth, etc. Output device(s) 1040 use some of the same type of ports as input device(s) 1036.

Thus, for example, a USB port can be used to provide input to computer 1012 and to output information from computer 1012 to an output device 1040. Output adapter 1042 is provided to illustrate that there are some output devices 1040, like display devices, light projection devices, monitors, speakers, and printers, among other output devices 1040, which use special adapters. Output adapters 1042 comprise, by way of illustration and not limitation, video and sound devices, cards, etc. that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, a workstation, a microprocessor based appliance, a peer device, or other common network node and the like, and typically comprises many or all of the elements described relative to computer 1012.

For purposes of brevity, only a memory storage device 1046 is illustrated with remote computer(s) 1044. Remote computer(s) 1044 is logically connected to computer 1012 through a network interface 1048 and then physically and/or wirelessly connected via communication connection 1050. Network interface 1048 encompasses wire and/or wireless communication networks such as local-area networks (LAN) and wide-area networks (WAN). LAN technologies comprise fiber distributed data interface (FDDI), copper distributed data interface (CDDI), Ethernet, token ring and the like. WAN technologies comprise, but are not limited to, point-to-point links, circuit switching networks like integrated services digital networks (ISDN) and variations thereon, packet switching networks, and digital subscriber lines (DSL).

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and DSL modems, wireless modems, ISDN adapters, and Ethernet cards.

The computer 1012 can operate in a networked environment using logical connections via wired and/or wireless communications to one or more remote computers, cellular based devices, user equipment, smartphones, or other computing devices, such as workstations, server computers, routers, personal computers, portable computers, microprocessor-based entertainment appliances, peer devices or other common network nodes, etc. The computer 1012 can connect to other devices/networks by way of antenna, port, network interface adaptor, wireless access point, modem, and/or the like.

The computer 1012 is operable to communicate with any wireless devices or entities operatively disposed in wireless communication, e.g., a printer, scanner, desktop and/or portable computer, portable data assistant, communications satellite, user equipment, cellular base device, smartphone, any piece of equipment or location associated with a wirelessly detectable tag (e.g., scanner, a kiosk, news stand, restroom), and telephone. This comprises at least Wi-Fi and Bluetooth wireless technologies. Thus, the communication can be a predefined structure as with a conventional network or simply an ad hoc communication between at least two devices.

The computer 1012 is operable to communicate with any wireless devices or entities operatively disposed in wireless communication, e.g., desktop and/or portable computer, server, communications satellite, etc. This includes at least WiFi and Bluetooth® wireless technologies. Thus, the communication can be a predefined structure as with a conventional network or simply an ad hoc communication between at least two devices.

WiFi, or Wireless Fidelity, allows connection to the Internet from a couch at home, a bed in a hotel room, or a conference room at work, without wires. WiFi is a wireless technology similar to that used in a cell phone that enables such devices, e.g., computers, to send and receive data indoors and out; anywhere within the range of a base station. WiFi networks use radio technologies called IEEE 802.11 (a, b, g, n, etc.) to provide secure, reliable, fast wireless connectivity. A WiFi network can be used to connect computers to each other, to the Internet, and to wired networks (which use IEEE 802.3 or Ethernet). WiFi networks operate in the unlicensed 5 GHz radio band at an 54 Mbps (802.11a) data rate, and/or a 2.4 GHz radio band at an 11 Mbps (802.11b), an 54 Mbps (802.11g) data rate, or up to an 600 Mbps (802.11n) data rate for example, or with products that contain both bands (dual band), so the networks can provide real-world performance similar to the basic 10BaseT wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. In an aspect, when a processor executes instructions to perform "operations", this could include the processor performing the operations directly and/or facilitating, directing, or cooperating with another device or component to perform the operations In the subject specification, terms such as "data store," data storage," "database," "cache," and substantially any other information storage component relevant to operation and functionality of a component, refer to "memory components," or entities embodied in a "memory" or components comprising the memory. It is noted that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Furthermore, the terms "user," "consumer," "client," and the like are employed interchangeably throughout the subject specification, unless context warrants particular distinction(s) among the terms. It is noted that such terms can refer to human entities or automated components/devices supported through artificial intelligence (e.g., a capacity to make inference based on complex mathematical formalisms), which can provide simulated vision, sound recognition and so forth.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

Artificial intelligence based systems, e.g., utilizing explicitly and/or implicitly trained classifiers, can be employed in connection with performing inference and/or probabilistic determinations and/or statistical-based determinations as in accordance with one or more aspects of the disclosed subject matter as described herein. For example, an artificial intelligence system can be used, via the node manager component 100, to dynamically apportion resources described herein.

A classifier can be a function that maps an input attribute vector, $x=(x1, x2, x3, x4, xn)$, to a confidence that the input belongs to a class, that is, $f(x)=confidence (class)$. Such classification can employ a probabilistic and/or statistical-based analysis (e.g., factoring into the analysis utilities and costs) to infer an action that a user desires to be automatically performed. In the case of communication systems, for example, attributes can be information received from access points, servers, components of a wireless communication network, etc., and the classes can be categories or areas of interest (e.g., levels of priorities). A support vector machine is an example of a classifier that can be employed. The support vector machine operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein can also be inclusive of statistical regression that is utilized to develop models of priority.

In accordance with various aspects of the subject specification, artificial intelligence based systems, components, etc. can employ classifiers that are explicitly trained, e.g., via a generic training data, etc. as well as implicitly trained, e.g., via observing characteristics of communication equipment, e.g., a server, etc., receiving reports from such communication equipment, receiving operator preferences, receiving historical information, receiving extrinsic information, etc. For example, support vector machines can be configured via a learning or training phase within a classifier constructor and feature selection module. Thus, the classifier(s) can be used by an artificial intelligence system to automatically learn and perform a number of functions.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
receiving, by a first node device comprising a processor from a second node device, status data representative of status of the second node device;
in response to the receiving the status data, by the first node device, purging a cache of the first node device to allocate space for cached data from the second node device;
in response to the purging the cache of the first node device, sending, by the first node device, update data indicative of the cache having been purged by the first node device; and
in response to the sending the update data, receiving, by the first node device, the cached data from the second node device.

2. The method of claim 1, wherein the status is associated with a shutdown of second node device.

3. The method of claim 1, wherein the status is indicative of a removal of the second node device from a group of node devices comprising the first node device.

4. The method of claim 1, wherein the purging the cache of the first node device is based on a memory size of the first node device.

5. The method of claim 4, wherein the memory size is associated with a random access memory of the first node device.

6. The method of claim 1, wherein the purging the cache of the first node device comprises reducing a level from a first cache level to a second cache level lower than the first cache level.

7. The method of claim 1, wherein the status data comprises time data indicative of a time remaining for the second node device to be in a current state.

8. A system, comprising:
a processor; and
a memory that stores executable instructions that, when executed by the processor, facilitate performance of operations, comprising:
receiving status data associated with a status of a first node device of a group of node devices;
facilitating transmitting the status data to a second node device of the group of node devices;
based on a memory associated with the second node device, receiving acknowledgment data representative of first cache data associated with a first cache of the second node device; and
based on the acknowledgment data, facilitating transmitting second cache data associated with a second cache of the first node device to the first cache of the second node device.

9. The system of claim 8, wherein the status data comprises time data representative of a time duration until the first node device is removed from the group of node devices.

10. The system of claim 9, wherein the operations further comprise:
in response to the receiving the status data comprising the time data, modifying an internet protocol address of the first node device based on the time duration.

11. The system of claim 8, wherein the operations further comprise:
facilitating modifying the group of node devices by adding a third node device to the group of node devices.

12. The system of claim 8, wherein the acknowledgment data comprises purge data representative of a data purge of the first cache.

13. The system of claim 12, wherein the data purge is a function of a memory size of the second node device.

14. The system of claim 8, wherein the operations further comprise:
in response to the receiving the acknowledgment data, transmitting redirect data, representative of an instruction to redirect a communication from the first node device to the second node device, to a client device.

15. A computer-readable storage medium comprising instructions that, in response to execution, cause a server device comprising a processor to perform operations, comprising:
receiving status data associated with an imminent status of a first node device of a group of node devices;
facilitating transmitting the status data to a second node device of the group of node devices;
based on a memory associated with the second node device, receiving acknowledgment data representative of an acknowledgment that the second node device received the status data;
based on the acknowledgment data, facilitating transmitting cache data from the first node device to the second node device; and
in response to the facilitating the transmitting the cache data, removing the first node device from the group of node devices.

16. The computer-readable storage medium of claim 15, wherein the operations further comprise:
in response to the removing the first node device, modifying an internet protocol address to facilitate communication with the second node device.

17. The computer-readable storage medium of claim 16, wherein the operations further comprise:
based on the modifying the internet protocol address, transmitting the internet protocol address to a client device.

18. The computer-readable storage medium of claim 15, wherein the cache data is first cache data, and wherein the operations further comprise:
facilitating purging second cache data from the second node device to allocate the memory for the first cache data, resulting in an allocated memory.

19. The computer-readable storage medium of claim 18, wherein the allocated memory is a random access memory.

20. The computer-readable storage medium of claim 15, wherein the acknowledgment data is first acknowledgement data, and wherein the operations further comprise:
in response to a time duration for second acknowledgement data from a third node device of the group of node devices being determined to have expired, removing the third node device from the group of node devices.

* * * * *